R. W. BURT.
HORIZONTAL WIND-WHEELS.

No. 194,988. Patented Sept. 11, 1877.

Figure 3:
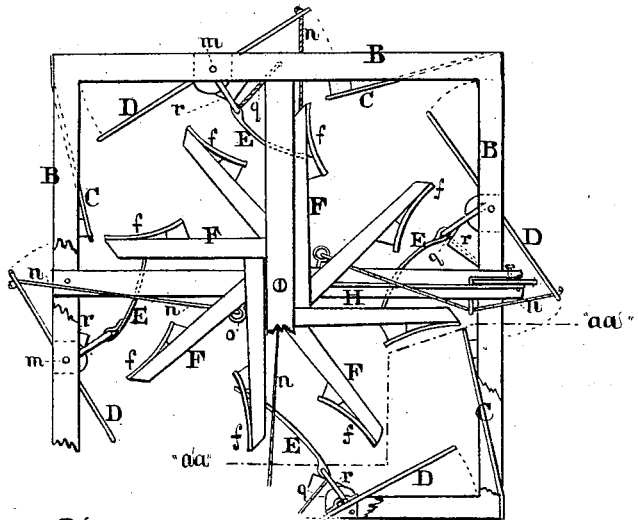

(Vert. sec. of half of machine on line "aa" fig. 3.)

Witnesses
Clarence Thurlow
John Sansten

Inventor
Richard W. Burt
(by E. Thurlow his
atty in fact)

UNITED STATES PATENT OFFICE.

RICHARD W. BURT, OF PEORIA, ILLINOIS.

IMPROVEMENT IN HORIZONTAL WIND-WHEELS.

Specification forming part of Letters Patent No. 194,988, dated September 11, 1877; application filed July 25, 1877.

*To all whom it may concern:*

Be it known that I, RICHARD W. BURT, of the city of Peoria, in the county of Peoria, in the State of Illinois, have invented an Improvement in Horizontal Wind-Wheels; and do hereby declare that the following is a full, clear, and exact description thereof, reference being had to the annexed drawings, making a part of this specification, in which like letters of reference refer to like parts, and in which—

Figure 1:
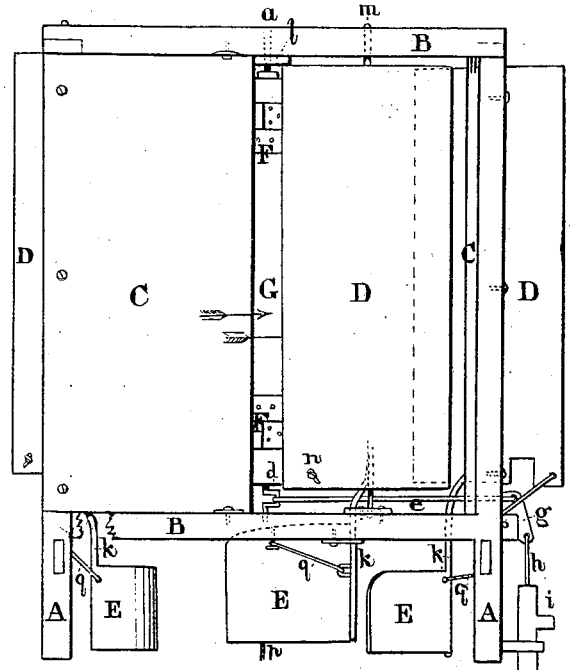
Figure 2:
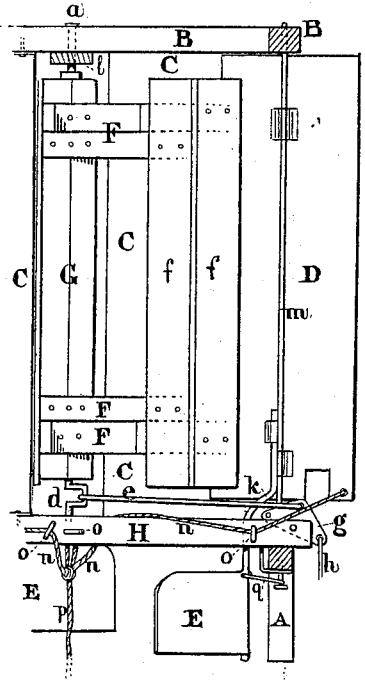

Figure 1 represents an elevation; Fig. 2, a vertical section through front part of machine, on line $a\ a$, $a\ a$, Fig. 3; Fig. 3, a plan.

This is an improvement on horizontal wind-wheels—*i. e.*, such as have vertical inclosing screens or valves for supply or regulation of wind—the object being to secure by the simplest form of devices proper "gathering" of the wind and quick and complete automatic control of the doors or valves which regulate and cut off the wind.

These devices consist in the form of said valves, their position, and of their connected vanes, which are directed inward toward the center of the machine, designed for effectiveness and compactness in automatically turning and closing the respective valves. All the valves can be automatically closed by means of central cord branching to each valve, said central cord being attached to a bucket at the overflow of the cattle-trough, or other receiver below, in a well-known mode.

It consists of the usual frame, inclosing a horizontally-rotating wheel with vertical vanes of common form, the shaft ending in a crank having a rod extending to an oscillating crank for working the pump or other mechanism.

My improvement is principally in the valves, or wind-regulators, of which there are four or more, pivoted vertically, above and below, near the middle of their upper and lower edges, to the horizontal bars of the frame, between fixed screens, so as to close the wind-openings by shutting against said screens. Each valve has an arm, projecting toward the center of the machine, set nearly to, or at a right angle with, the inner face of the valve, near its pivot, and, preferably, below the arms of the wheel. To said valve-arms are respectively attached a vane, so placed that, from whichever side the wind strikes the machine, (when too strong,) they receive the blast, and close the valves on that side to which they are respectively attached, and the wheel stops; but otherwise each valve is held open to gather a good "running" wind by means of a separate elastic tension or cord and pulley, so regulated, as to tension, that each will yield when the wind is too rough—*i. e.*, when the wind overcomes the tension by its power on the vanes of each valve.

In the drawing, which shows one of the forms in which I make this wind-wheel, A represents the four uprights which form the corners of and sustain the wheel and its case B, the connecting cross-pieces above and below the wheel G F. C are the fixed screens, one at each corner of the machine, which respectively cut off somewhat less than half of the wind-passage on each side of the machine, extending vertically between each upper and lower cross-bar B B in front of the wheel, and each secured at its outer edge to one of the uprights A, the other edge being directed inward at a slight angle; D, the valves, each consisting of a flat board or boards, or other strong material; each pivoted near or at the middle of their respective upper and lower edges in the respective bars B, so as to fill the wind-passage or opening between the edge of the respective screens and the opposite upright A, and shut against the inner end of its corresponding screen when operated upon by the vane E or the bucket-cords $p\ n$.

E represents the vanes, one being attached to the lower part of each valve, near or at its lower pivot-pin, so as to project under the wheel G F at a right angle or large angle with their respective valves, and to face the wind which is blowing upon such valve, being placed below the lower edges of screens, valves, and casing. Said vanes may each be curved, so as to be readily acted upon by the wind, and be attached to an arm, $k$, projecting from the valve inward and downward, and be made of a light, strong material, similar to the valves and screens.

Each valve D is held open by means of an elastic tension, $q$, or spring attached to the arm $k$ of the respective vanes E, or to the latter, and extended hence to the nearest bar B. This tension holds the valve open against bumpers r, respectively attached to said bars, until the wind, becoming too strong, or the cords p n are operated upon by the overflow-bucket mentioned, overcomes said tension by its action on the respective vanes E on the windward side of the machine. Each valve D has also a cord or chain, n, attached to its outer edge and running to the center of the machine through a ring, o, or pulley, near the wheel-shaft G, below which they merge into a cord, p, or chain, which may extend to the ground, or end in a bucket attached thereto, which may receive the overflow from the cattle-trough or other receiver, and by its weight pull the valves simultaneously inward and close the wind-passages, as in similar machines.

F represents the arms of the wind-wheel, eight in number, above and below, each set armed with vertical vanes f, (eight in number;) G, the wheel-shaft, pivoted above in cross-bar l, and below in bar H, where it has a crank, d, whence a connecting-rod, e, runs to a crank, g, pivoted vertically in a slot in the end of the bar H, one end of which is attached to a rod, h, or pump-rod. i represents the pump.

The operation of this wind-wheel needs little description. The screens C C C C direct the wind, together with the valves D, against the wheel G F f. The valves are prevented from opening too far by means of bumpers r, placed on the frame B to abut against the respective vanes E or their arms. The vanes E, projecting below the wheel and screens, readily catch the wind, when too strong, and close their respective valves D on the side toward the wind; but these are held open by elastic tension devices q, extending from each of the vanes E to the frame, but yield to strong wind blowing upon their respective vanes, as said. A cord or cords, n n n n p, extending to the outer edge of each valve D, draws in the latter and closes all wind-openings by means of an attached bucket placed under the overflow below, or other simple tension.

What I claim as my invention is—

1. In a horizontal wind-wheel, a shut-off valve, pivoted above and below to the frame or inclosing-case, said valve having an operating-vane projecting from it inward toward the wheel, to close said valve automatically when the wind is too high, substantially as described.

2. The combination, with the vertical fixed screens or casing, of a horizontal wind-wheel of several valves or vertical doors, pivoted at their top and bottom, in the wind-passages, each having a vane projecting toward the center of the machine, and held against the lighter winds by elastic tension devices extended between said vanes and the frame or casing of the machine, substantially as and for the purposes described.

3. The combination, with the fixed screens C, of the respective pivoted valves D and vanes E, having tension devices q or springs, or other temporary stays, attached to a fixed point, substantially as and for the purposes described.

4. The fixed screens C, in combination with the frame A B and valves D, vanes E, and tension devices q, substantially as and for purposes described.

5. The vanes E placed within the casing of the machine, (i. e., within the circle of the frame, screens, and valves,) in combination with their respective valves D, operated by the wind and the tension devices q, respectively, substantially as described.

6. The combination of screens C, valves D having vanes E and tension devices q, frame A B, and wheel G F f, substantially as and for purposes described.

In testimony that I claim the foregoing wind-wheel I have hereunto set my hand.

RICHD. W. BURT.

Witnesses:
 H. W. WELLS,
 CLARENCE THURLOW.